US 6,750,913 B1

(12) United States Patent
Noro et al.

(10) Patent No.: US 6,750,913 B1
(45) Date of Patent: Jun. 15, 2004

(54) CAMERA CONTROL SYSTEM WITH IMAGE PARAMETER DISPLAY DEVICE

(75) Inventors: Hideo Noro, Tokyo (JP); Hiroaki Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/236,220

(22) Filed: Jan. 25, 1999

(30) Foreign Application Priority Data

Jan. 30, 1998 (JP) .............................. 10-018930

(51) Int. Cl.⁷ .............................................. H04N 5/222
(52) U.S. Cl. ..................... 348/333.02; 348/207.11; 348/211.7; 348/211.8; 345/786; 345/787; 345/833
(58) Field of Search ................ 348/14.08, 14.09, 348/211.3, 333.02, 211.7, 211.8, 211.9, 211.13, 207.1, 207.11; 345/704, 786, 787, 830, 833, 970

(56) References Cited

U.S. PATENT DOCUMENTS

| 6,133,941 A | * | 10/2000 | Ono ............................ 348/211 |
| 6,414,716 B1 | * | 7/2002 | Kawai ......................... 348/211 |
| 6,611,285 B1 | * | 8/2003 | Morita ...................... 348/211.3 |
| 2002/0024607 A1 | * | 2/2002 | Suga et al. ................. 348/333 |

* cited by examiner

Primary Examiner—Wendy R. Garber
Assistant Examiner—Justin Misleh
(74) Attorney, Agent, or Firm—Fitzpatrick, Cella, Harper & Scinto

(57) ABSTRACT

A camera control system acquires present camera parameter information, and simultaneously displays camera parameter information set by a user and the acquired present camera parameter information to facilitate appropriate remote control of camera operation via a network.

18 Claims, 11 Drawing Sheets

CAMERA CONTROL SYSTEM WITH IMAGE PARAMETER DISPLAY DEVICE

BACKGROUND OF THE INVENTION

1. Field of the Invention

The present invention generally relates to camera control systems adapted for monitor cameras.

2. Description of the Related Art

In conventional control of a remote camera by means of a network or the like, the remote camera is operated using a control terminal, and a control function window is displayed on the display screen of a control terminal (see FIG. 11).

In FIG. 11, a picture display area 901 displays an image captured by the camera. A scroll bar 904 is used to control operation of the camera in the tilt direction. By moving a cursor with a mouse or the like to drag a slide key 904a, this operation is controlled. A scroll bar 905 is used to control operation of the camera in the pan direction. By using the mouse or the like to drag a slide key 905a, this operation is controlled. A scroll bar 906 is used to control operation of the camera to zoom in/out. By using the mouse or the like to drag a slide key 906a, this operation is controlled.

The displayed positions of the slide keys 904a, 905a, and 906a indicate the respective current (present) parameters of the camera, namely, image-capturing directions set by a user, and a zoom magnification.

In the above-described conventional control of cameras, the displayed position of the slide keys 904a, 905a, and 906a, may be shifted compared with a camera parameter obtained when the presently displayed image was captured, due to limitations in the communication speed of the network, or to a data transfer delay caused by camera control processing.

Thus, the user cannot easily see that the presently displayed image is either an image obtained when a camera control operation terminated in accordance with an instruction from the user, or an image obtained when camera control is being performed. Image control operations of the camera are not immediately responsive to an instruction from the user, which causes the user to send unnecessary operation control instructions to the camera. As a result, there is a possibility that the user will not send appropriate operation control instructions to the camera.

SUMMARY OF THE INVENTION

Accordingly, for solving the foregoing problems, it is an object of the present invention to provide a camera control system capable of executing appropriate control of camera operations.

To this end, according to an aspect of the present invention, the foregoing object has been achieved through provision of a camera control system, comprising: acquisition means for acquiring present camera parameter information; and display means for simultaneously displaying camera parameter information based on a control command input by input means and the present camera parameter information acquired by the acquisition means.

According to another aspect of the present invention, the foregoing object has been achieved through provision of a control method, comprising: an input step for inputting a control command for controlling operation of a camera; a control step for controlling the camera, based on the control command input in the input step; an acquisition step for acquiring camera parameter information in accordance with the control operation of the camera in the control step; and a display step for simultaneously displaying camera parameter information based on the control command input in the input step, and the camera parameter information acquired in the acquisition step.

According to a further aspect of the present invention, the foregoing object has been achieved through provision of a storage medium containing a program for executing a camera-control-system process for enabling control of cameras, the program comprising the steps of: inputting a control command for controlling operation of a camera; acquiring present camera parameter information; and simultaneously displaying camera-parameter-related information and the acquired present camera parameter information.

Other objects and features of the present invention will become apparent from the following description and the attached drawings.

DESCRIPTION OF THE PREFERRED EMBODIMENTS

An embodiment of the present invention will be described below with reference to the attached drawings.

Figure 1:
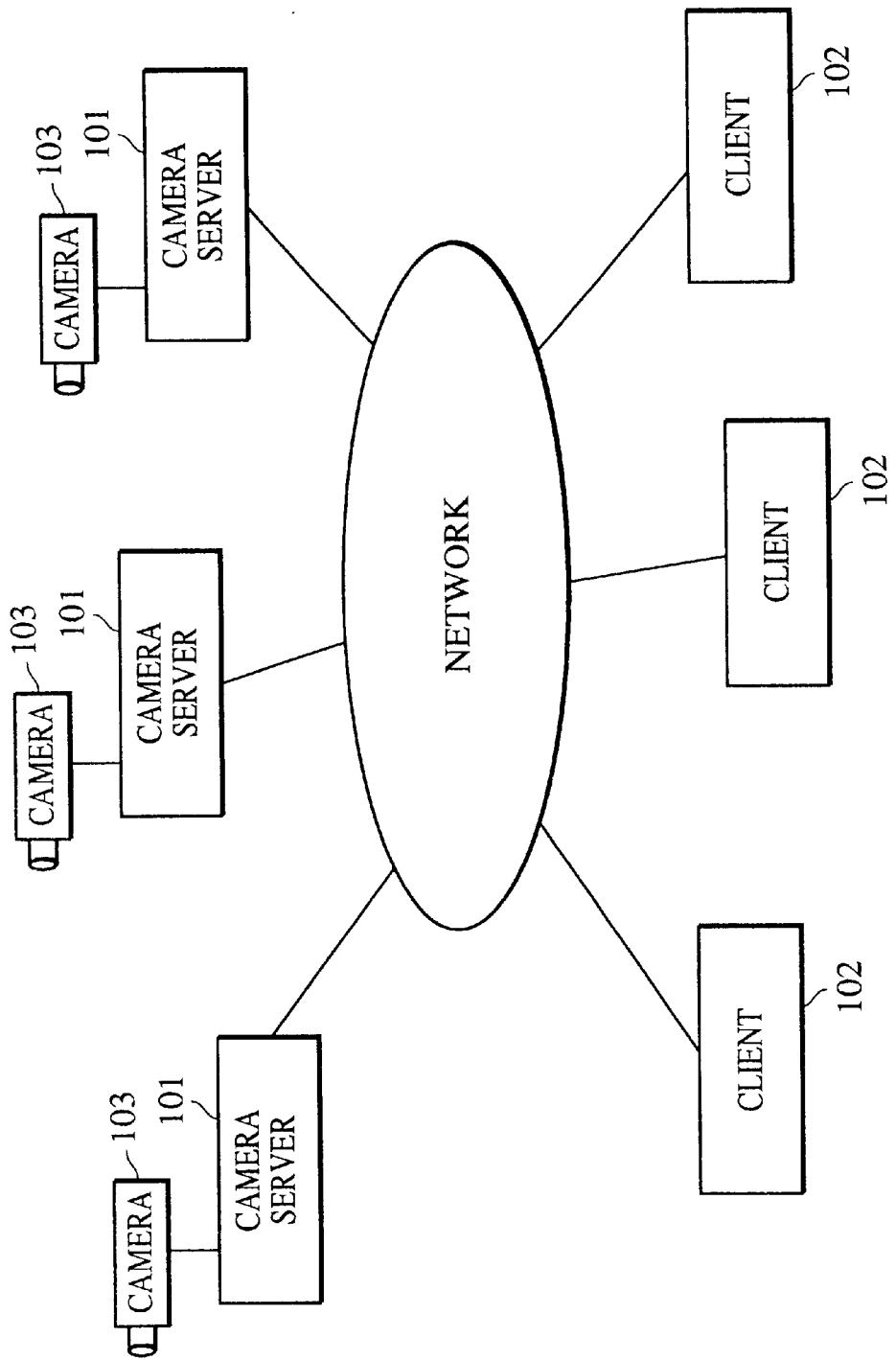
FIG. 1 is a block diagram showing a camera control system according to an embodiment of the present invention.

FIG. 1 shows a camera control system according to a typical embodiment of the present invention. The camera control system variously includes a plurality of camera servers 101, a plurality of user terminals (clients) 102, and a plurality of cameras 103. The image-capture direction of each camera 103 (e.g., the pan, tilt, and zoom directions) is controlled using conventional external commands, such as a pulse value for controlling a zoom operation of a zoom lens, etc.

The camera servers 101 and the clients 102 each include information processing apparatuses such as computers, and are connected to a network such as the Internet or an intranet. In the camera control system according to this embodiment, a request (image-distribution command) selectively is transmitted from one client 102 to one camera server 101 via the network. When the selected camera server 101 receives the request, image data is distributed from the selected camera server 101 to each client 102, and each client 102 displays an image captured by the selected camera 103.

A camera control command is transmitted from selected client 102 to selected camera server 101, whereby operation of the corresponding camera 103 is controlled to zoom in or out, pan, or tilt the camera 103. Each client 102 can select any camera server to access from among the plural camera servers 102.

Figure 2:
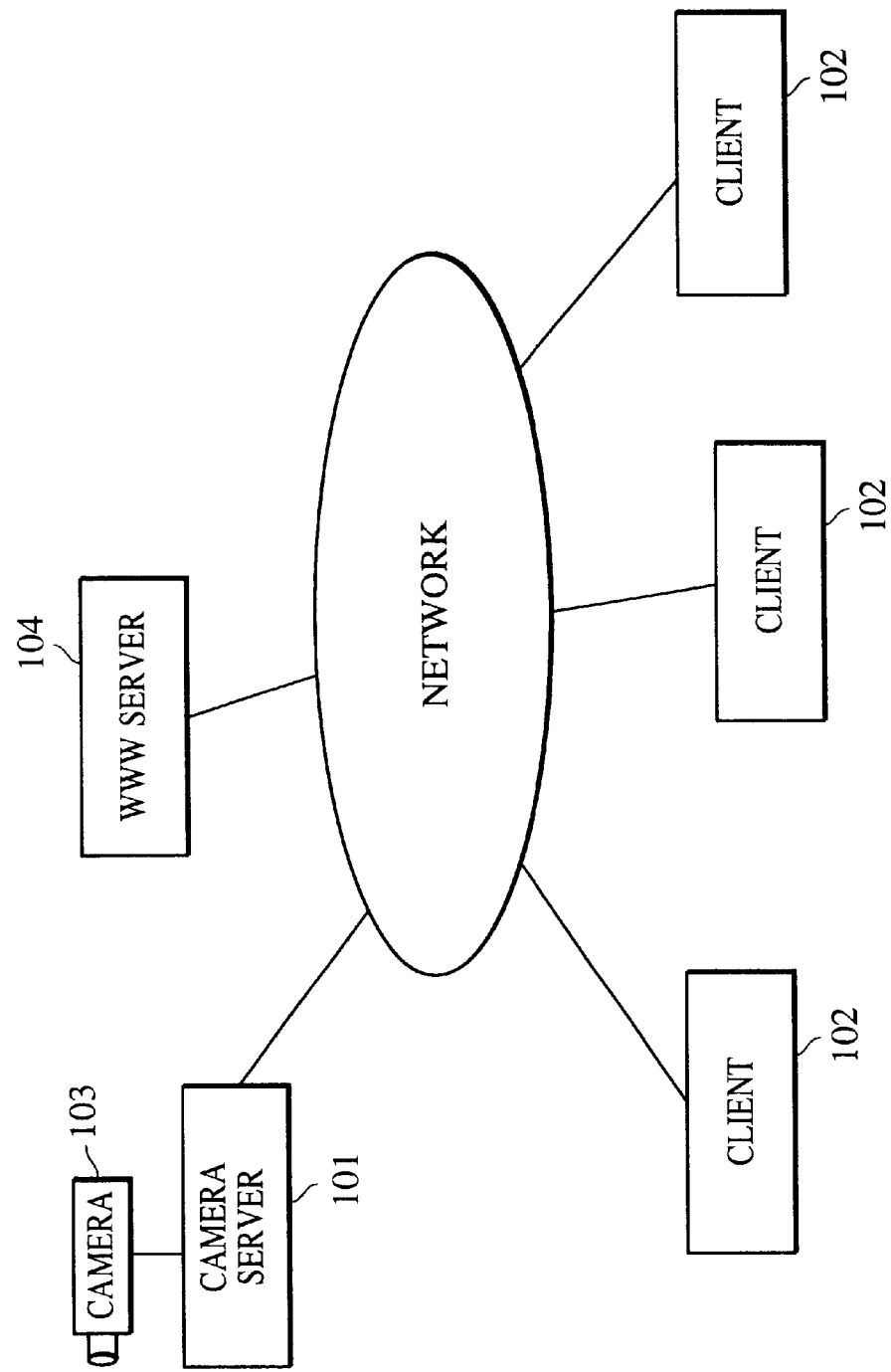
FIG. 2 is a block diagram showing a camera control system according to an embodiment of the present invention.

FIG. 2 shows a modification of the camera control system shown in FIG. 1, and includes widely available world-wide-web (WWW) technology. A WWW server 104 is connected to a network. Web-page data in the WWW server 104 include links representing addresses at which connection to camera servers 101 selectively can be established. Each link enables easy connection to a desired camera server 101.

In FIG. 1, each of the camera servers 101 which are connected to the WWW system on the Internet functions as a WWW server, and each of the clients 102 has built-in WWW-browser software. The camera servers 101 and the clients 102 mutually communicate in accordance with the hypertext transfer protocol (HTTP) or the like.

In the WWW, a server using another protocol may be directly accessed or accessed by a gateway, and responses that are ultimately transformed into hypertext form are displayed to users. In other words, in accordance with a uniform resource locator (URL) representing a location in which document data and image data are stored, a WWW browser presents its information to a WWW server containing document data and image data. The WWW server responds to the WWW browser with document data and image data corresponding to the information.

Figure 3:
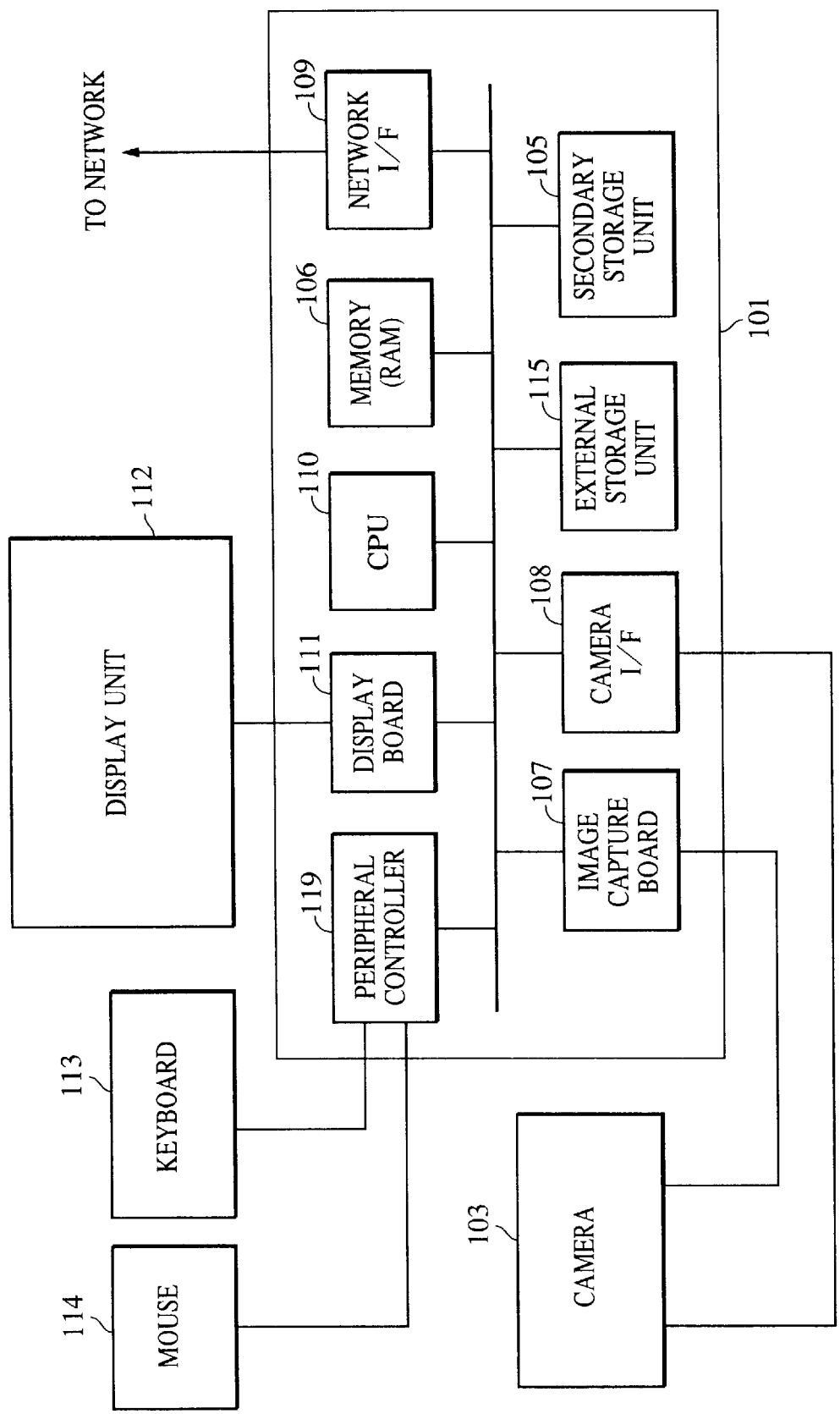
FIG. 3 is a block diagram showing a camera server in a camera control system according to an embodiment of the present invention.

FIG. 3 shows an example of the hardware of a camera server 101 and a camera 103. This example of the camera server 101 includes a secondary storage unit 105 such as a program-stored hard disk drive or read only memory, a random access memory (RAM) 106, an image capture board 107 for capturing picture data, a camera interface (I/F) 108 for transmitting a control command to the camera 103, a network I/F 109 for connecting the camera server 101 to the network, a central processing unit (CPU) 110 for executing various processes based on the programs, and an external storage unit 115 for loading external programs, a display board 111 for communicating with a display unit 112, and a peripheral controller 119.

When the keyboard 113, the mouse 114, and the camera 103 are controlled by the camera server 101, a control command can be input to the camera control system. A signal input with the keyboard 113 or the mouse 114 is input to the peripheral controller 119. A picture signal captured by the camera 103 is transformed into a predetermined signal via the image capture board 107. Based on the transformed signal, an image is displayed on the display unit 112 via the display board 111.

The camera 103 may include a conventional zoom lens (not shown) for optically controlling an angle of camera view (zoom angle), an the zoom angle of the camera may be controlled by changing the position of the zoom lens (by changing the pulse value) in the image-capture direction. The position of the zoom lens can be controlled/changed by the CPU 110. The camera 103 may be provided with a conventional pan head (not shown) for moving/shifting the image-capture direction, and which can be controlled by the CPU 110.

Figure 4:
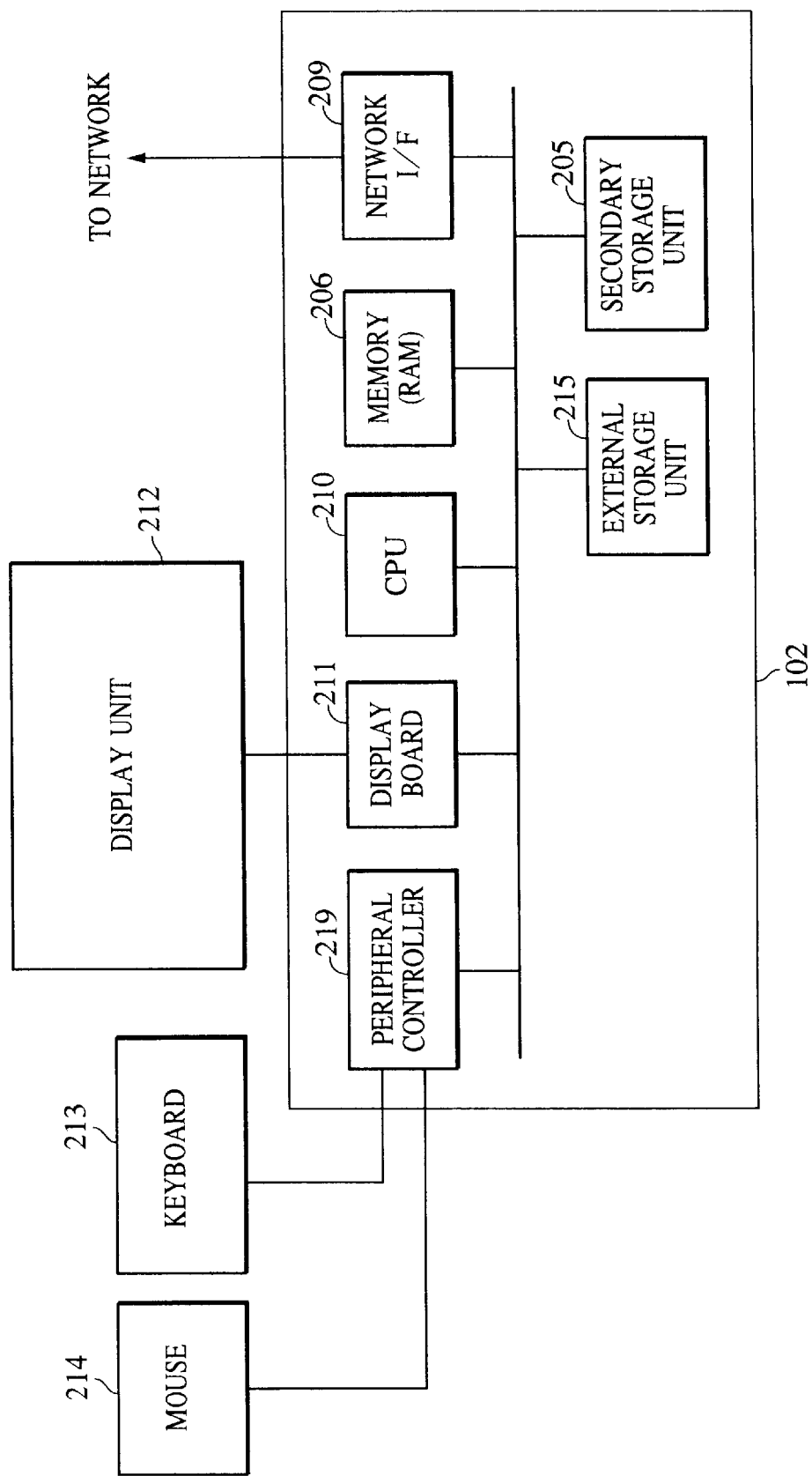
FIG. 4 is a block diagram showing a user terminal (client) in a camera control system according to an embodiment of the present invention.

FIG. 4 shows an example of the hardware of the client 102. The client 102 includes a secondary storage unit 205 such as a program-stored hard disk drive or ROM, a random access memory (RAM) 206, a network I/F 209 for connecting the client 102 to the network, a CPU 210 for executing various processes based on programs, an external storage unit 215 for loading external programs or data, a mouse 214 and a keyboard 213 for inputting control commands for controlling a camera 103 connected to a camera server 101 via the network, a peripheral controller 219 for receiving an input signal from a mouse 214 or a keyboard 213, a display unit 212 for displaying an image captured by a selected camera, and a display board 211 for transforming a signal transmitted from the camera server 101 into a predetermined signal.

Figure 5:
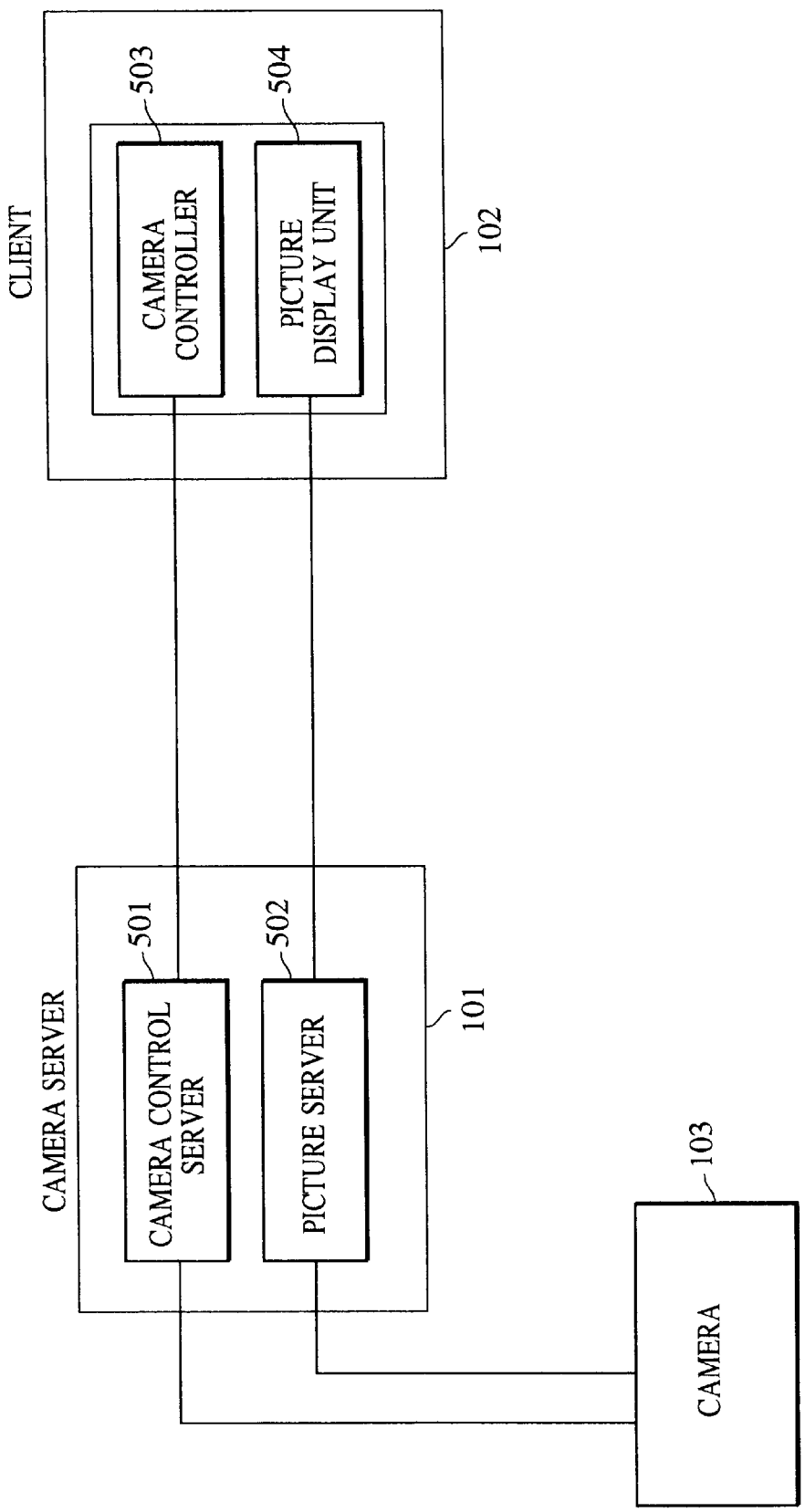
FIG. 5 is a block diagram showing software used in a camera control system according to an embodiment of the present invention.

FIG. 5 shows software components of the camera control system according to this embodiment. As shown in FIG. 5, the camera server 101 includes two modules: a camera control server 501 for controlling a camera 103, based on a camera control command; and a picture server 502 for distributing an image signal captured by the camera 103 to a client 102.

The user terminal (client) 102 includes a camera: controller 503 for responding to a camera control command or a notification of status of camera 103 transmitted via the camera server 101, and a picture display unit 504 for performing display processing of camera pictures.

Figure 6:
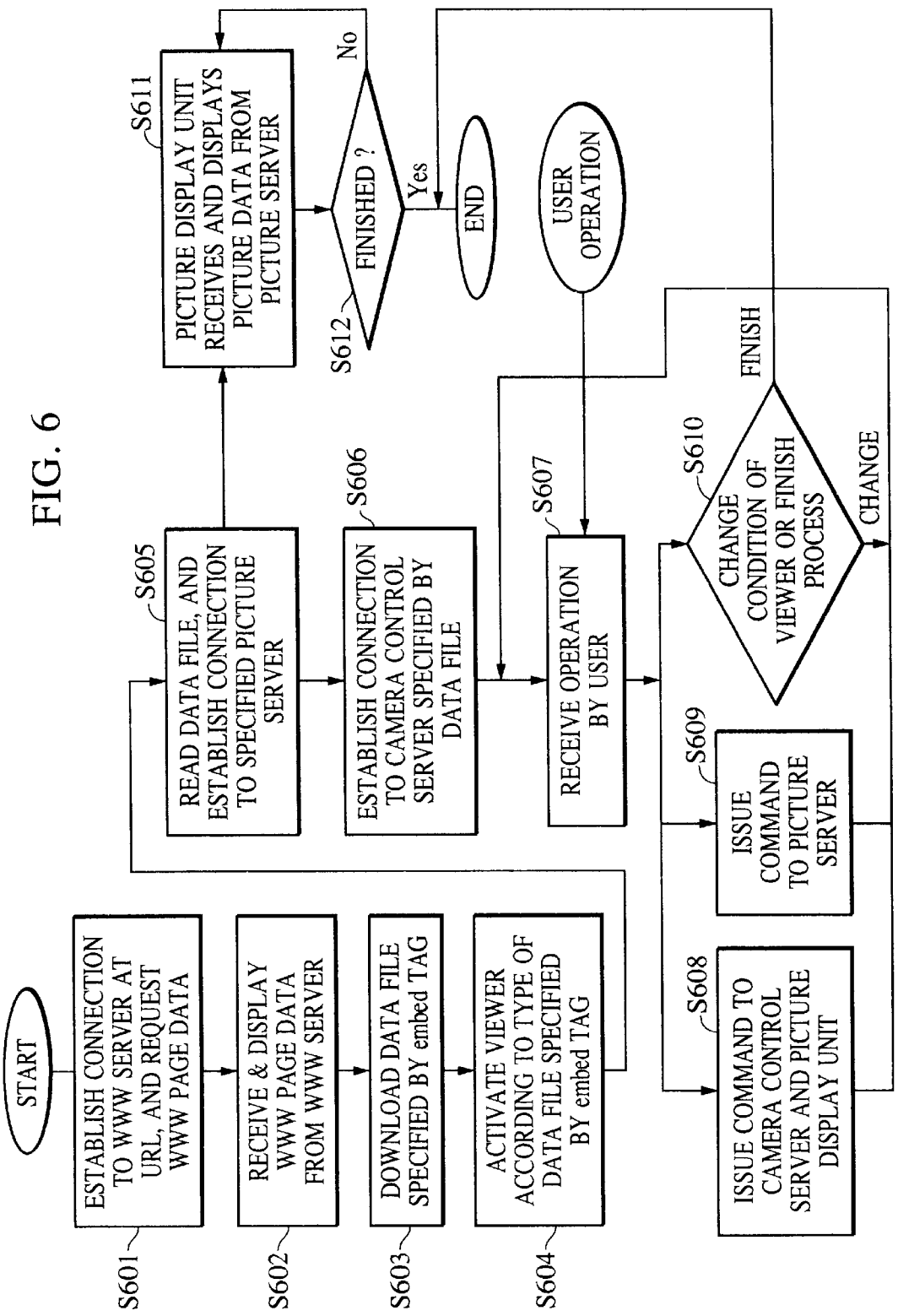
FIG. 6 is a flowchart showing a process performed by a client in a camera control system according to an embodiment of the presents invention.

FIG. 6 is a flowchart illustrating a detailed process performed by the CPU 210 in the client 102. In step S601, a user establishes connection to a WWW server corresponding to a specified URL using a WWW browser program stored in the secondary storage unit 205, and requests web-page data described in the hypertext markup language (HTML). In step S602, the WWW browser receives web-page data from the WWW server, and displays an image based on the web-page data, on the display unit 212.

In this embodiment, the web-page data includes an "embed tag" or "hyperlink", which represents information for establishing connection to the camera server 101, as follows:

<embed src="camera1.wvp" width=480 heigh=320>.

In step S603, the WWW browser accesses the WWW server to download a data file ("camera1.wvp" file in the above case) specified by the embed tag.

In step S604, the WWW browser activates programs corresponding to the identifier of the downloaded data file, namely, programs in the client 102 of the camera control system (the camera controller 503 and the picture display unit 504) according to this embodiment.

In step S605, the activated programs read the downloaded data file, and display the data on the display unit 212 of the camera servers 101 based on address and connection-port information described in the data file. The activated programs establish connection to the picture server 502 of the camera server 101 selected by the user from among the plurality of camera servers 101.

In step S611, the picture display unit 504 is activated as a program for performing a process after establishing connection to the camera server 101 (a thread or a process is activated in practice). The program displays images captured by the selected camera 103 on the display unit 212 whenever receiving picture data from the picture server 502 until connection to the camera server 101 is terminated.

In step S612, when connection to the selected camera server 101 is terminated, the displaying of captured images stops.

In step S606, the camera controller 503 for controlling operation of the camera 103 establishes connection to the camera control server 501 in accordance with information (described in the downloaded data file) about the address and connection port of the camera control server 503.

In step S607, a control command is input by the user by operating the mouse 214 or the keyboard 213. In step S608, in the case where the input control command relates to camera control, the camera controller 503 outputs a command to the selected camera control server 501, and notifies the picture display unit 504 of the output command if necessary.

In step S609, in the case where the input control command relates to processing to be performed by the picture server 502, the picture display unit 504 outputs a command to the picture server 502.

In step S610, if the input control command is for changing the status of the client 102 (e.g., changing an image display size), the operating system (OS) (not shown) of the client 102 updates the internal status of the client 102. If the input control command is for terminating user operation control, each program (the camera controller 503, the picture display unit 504, or the like) related to the client processing is sequentially terminated. When the CPU 110 completes execution of steps S608 to S610, it returns to step S607, and waits for the user to input the next operation command/request. When a control command is input, processing similar to steps S608 to S610 is performed.

Figure 7:
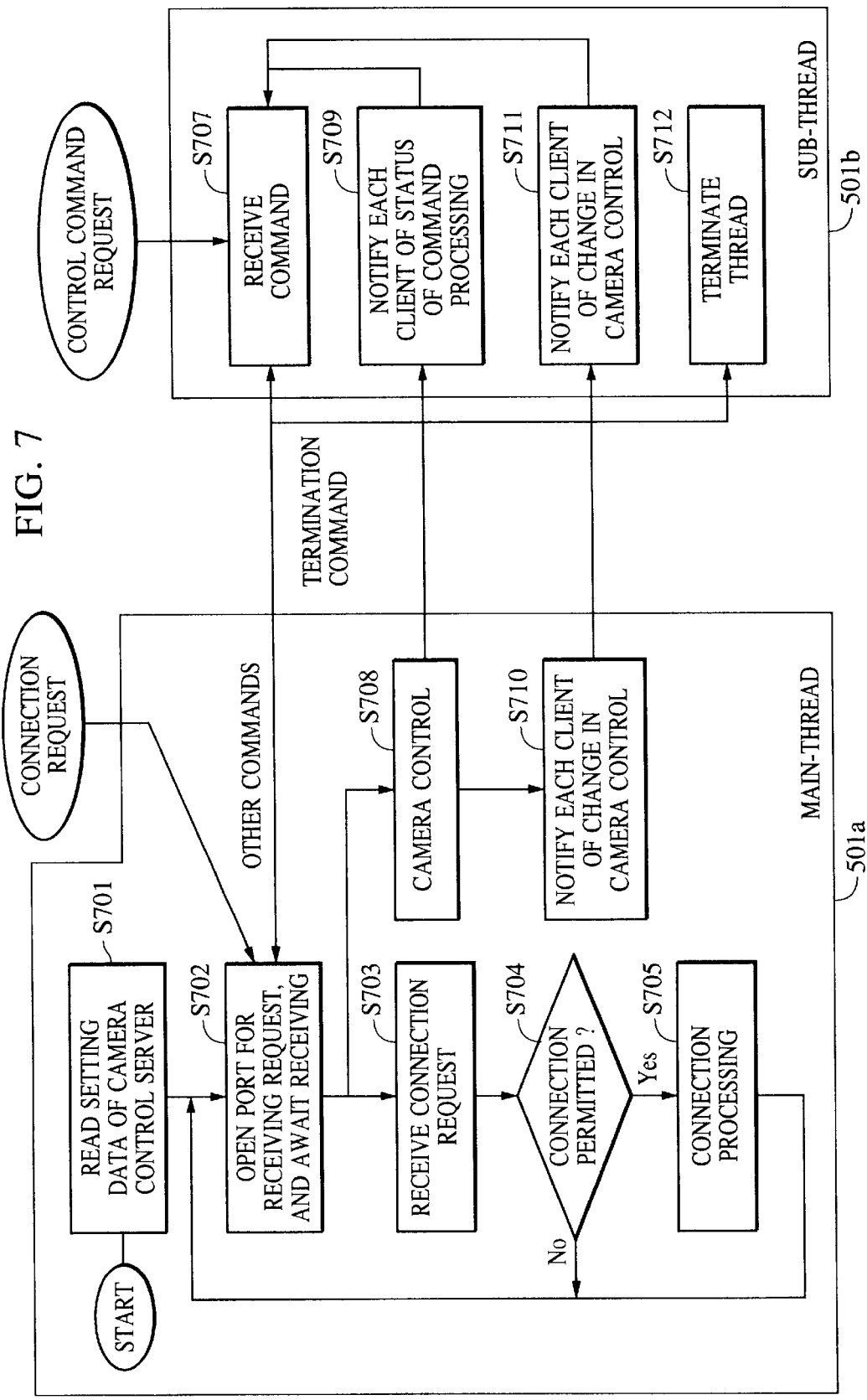
FIG. 7 is a flowchart showing the processing of a camera control command, performed by a camera server in a camera control system according to an embodiment of the present invention.

FIG. 7 is a detailed flowchart showing a process performed by the camera control server 501 in a camera server 101, using a CPU 110. In FIG. 7, the camera control server 501 includes a main-thread 501a for performing main processing and a sub-thread 501b for performing command transmission/reception with a client 102 connected thereto. FIG. 7 shows only one sub-thread 501b. However, in the case where a plurality of clients 102 are connected, a plurality of corresponding sub-threads 501b perform the necessary processing steps.

In step S701, at the start of the process, a camera control server 501 reads operation-setting information for the camera control server 501 from a particular file (or a database such as a registry depending on the OS) provided in the external storage unit 115, and starts to operate based on the read information.

In step S702, the CPU 210 opens a port for receiving a request from a client 102, and awaits reception of a request.

When the camera control server 501 receives a request (a connection request or an operation command request), if the request is a connection request, the CPU 210 proceeds to step S703, and it determines whether to permit connection with the client 102 that transmitted the connection request. In step S704, if the CPU 210 determines negatively, it responds with an error code for connection rejection before returning to step S702. If it determines affirmatively, it proceeds to step S705, and activates a sub-thread 501b for receiving a command from the client 102, and performs client registration before returning to step S702.

In step S707, the CPU 210 uses the activated sub-thread 501b to receive the command from the client 102 permitted to establish connection with the camera server 101, and transfers the received command to the main-thread 501a. The main-thread 501a receives it in step S702, and confirms whether it is a camera control command. The main-thread 501a proceeds to step S708, and executes a controlling operation of the camera 103.

In step S709, the sub-thread 501b outputs to the client 102 having requested camera control a code representing whether appropriate camera control has already been performed. The main-thread 501a acquires present-status information from the camera 103 in step S708, and notifies each sub-thread 501b corresponding to each client 102 being connected, of a status (e.g., a pan/tilt/zoom value) changed in accordance with a control operation of the camera 103.

In step S709, the sub-thread 501b transmits image data, and a camera parameter representing pan, tilt, or zoom control, in accordance with a change in the camera control.

In step S712, if the sub-thread 501b receives a command for connection termination from the corresponding client 102, it notifies the main program of the command, and terminates its control operation.

In control processing, there is a case in which a request for assigning a camera-control right (priority) is required before a specific command is issued. This prevents confusion from occurring when a plurality of users each requests a camera control operation for the same camera. In such a case, the client 102 issues a request command for obtaining a camera-control right, and the camera server 501 selects rejection, assignment, or waiting status, based on the present condition of assigning camera-control rights (priority), and responds to the client 102 with the selected answer.

By way of example, the camera-control right is determined based on a shorter period among a preset predetermined period and a period required until the client 102 terminates connection. When one client 102 loses a control right, the control right is assigned to the next client 102 waiting for its turn. Each client 102 can control the camera 103 during a period between the time when a camera control right is assigned and the time when camera control right is lost. The camera control server 501 receives an operation command from only the client 102 to which a camera-control right is assigned.

Figure 8A:
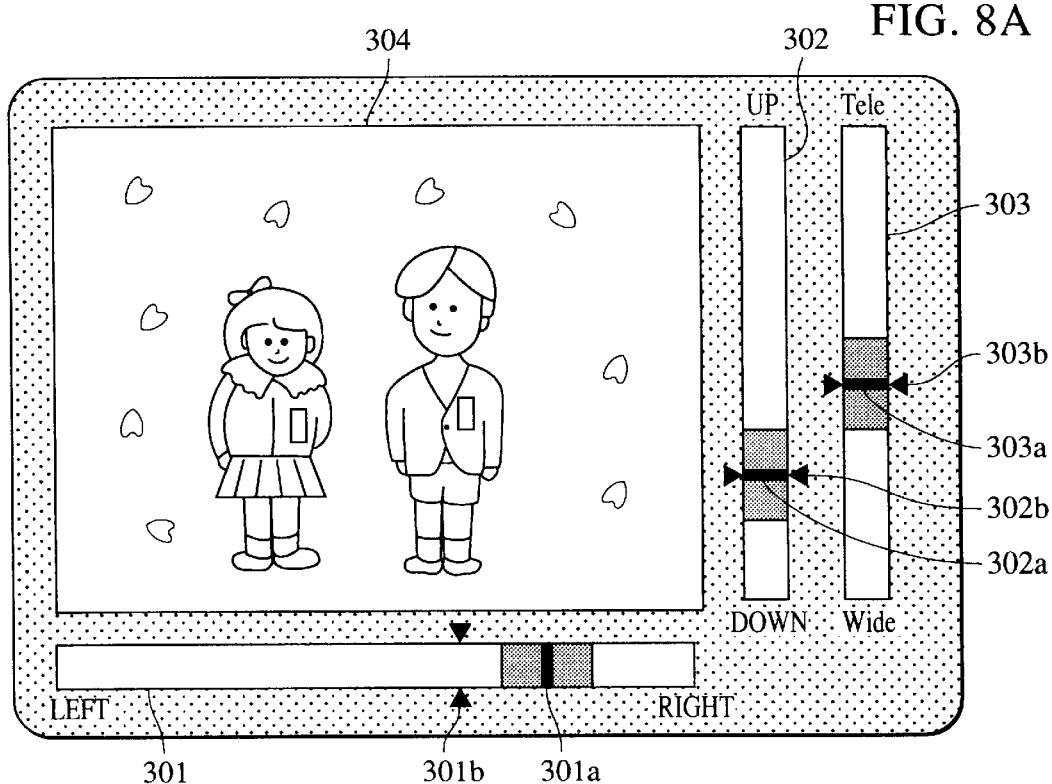
FIGS. 8A and 8B are drawings showing examples of a display screen of a client in a camera control system according to an embodiment of the present invention.
Figure 8B:
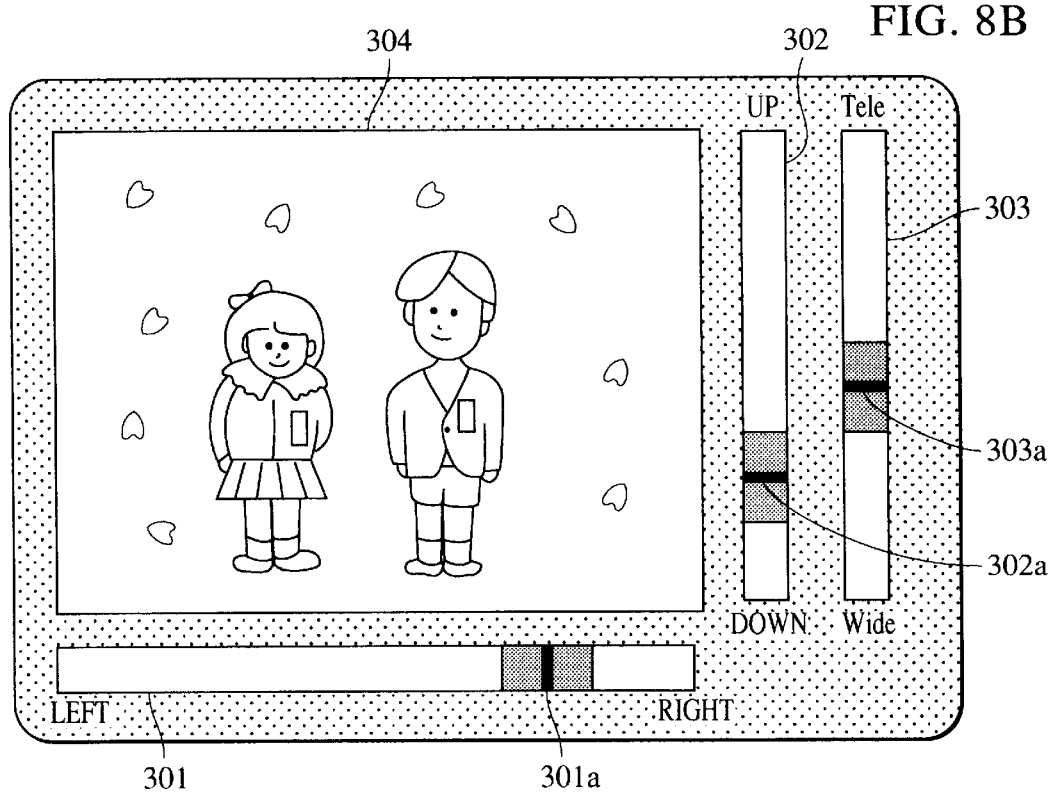

FIGS. 8A and 8B show examples of the display screen of a display unit 212.

In FIGS. 8A and 8B, an image display area 304 displays an image captured by a camera 103.

A scroll bar 301 is used to control operation of the camera 103 in the pan direction. By using the mouse 214 to horizontally drag a slide key 301a, a pan-directional control command can be generated. The display position of the slide key 301a corresponds to a pan angle of the camera 103 set by the user. The position of an index 301b corresponds to an image displayed in the image display area 304 at the current/present pan angle of the camera 103 (last-pan-angle information transmitted from the camera server 101).

A scroll bar 302 is used to control operation of the camera 103 in the tilt direction. By using the mouse 214 to vertically drag a slide key 302a, a tilt-directional control command can be generated. The display position of the slide key 302a corresponds to a tilt angle of the camera 103 set by the user. The position of an index 302b corresponds to an image displayed in the image display area 304 at the current/present pan angle of the camera 103 (the last-tilt-angle information transmitted from the camera server 101).

A scroll bar 303 is used to control operation of a zoom lens (an angle of camera view) of the camera 103. By using the mouse 214 to drag a slide key 303a, a zoom control command can be generated. The display position of the key 303a corresponds to the magnification of the camera 103 set by the user. The position of the index 303b corresponds to an image of the present zoom magnification (the last zoom-magnification information transmitted from the camera server 101) displayed in the image display area 304.

Figure 9:
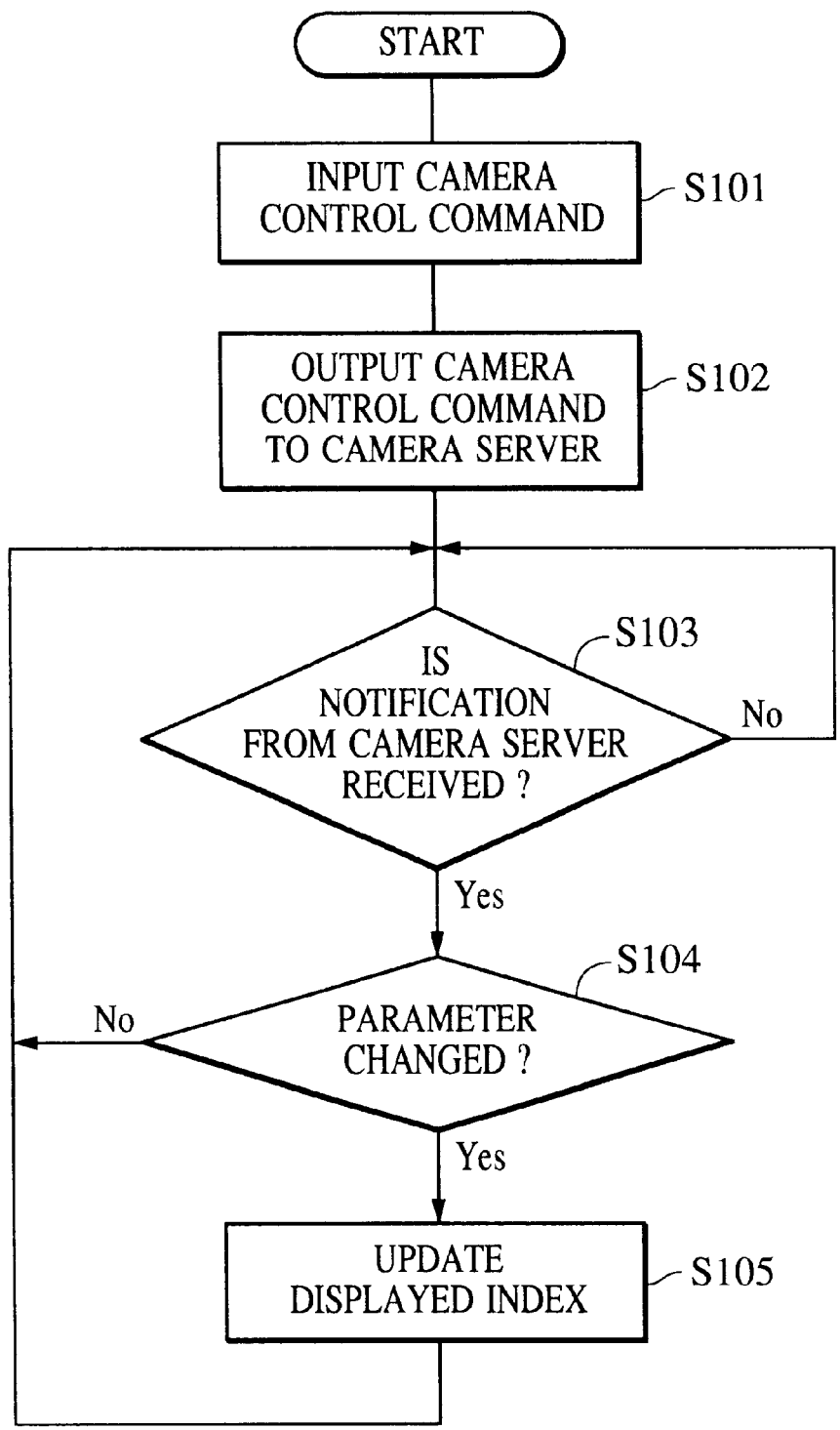
FIG. 9 is a flowchart showing a process performed by a client in a camera control system according to an embodiment of the present invention.

FIG. 9 shows a flowchart of a process for operation control by the client 102. The process is performed by the CPU 210.

As shown in FIG. 9, in step S101, the user uses the mouse 214 to perform dragging, a control command for controlling operation of the camera 103 is input. For example, as shown in FIG. 8A, by dragging the slide key 301a on the scroll bar 301 to the right, a control command for controlling operation of the camera 103 in the pan direction is generated based on the position to which the slide key 301a is moved.

In step S102, the CPU 210 outputs the generated control command for controlling operation of the camera 103 to the camera server 101. Based on the output control command, the camera server 101 controls operation of the camera 103. The camera server 101 also transmits to the client 102 image data and information about a parameter as a change in control of the camera 103 (a pan or tilt angle representing the camera 103 driven by the pan head, a camera zooming magnification, a focal subject distance, or the like).

In step S103, when the CPU 210 receives information related to a parameter of the camera 103, it proceeds to step S104. If a change is found in the received parameter, the CPU 210 updates the displayed index 301b, 302b, or 303b so as to correspond to the change of the parameter for the camera 103. As shown in FIG. 8A, when the camera control command is input, the slide key 301a and the index 301b are positioned at a distance apart from each other. However, whenever the CPU 210 is notified by the camera server 101 of a change in parameter for the camera 103, the index 301b is updated in the display. Accordingly, the index 301b gradually approaches the slide key 301a, and the key 301a and the index 301b are ultimately brought to the same display position. In step S104, if no change is found in the parameter from the camera server 101, no index is updated in the display.

As described above, according to this embodiment, the picture display area 304 displays parameters representing panning, tilting, and zooming, and parameters set by the user, whereby the user can see that the displayed image is either an image obtained when operation of the camera 103 is being controlled, or an image obtained after a control operation of the camera 103 is terminated.

As shown in FIG. 8B, in the case where the parameters for the camera 103 set by the user are equal to the parameters for the camera 103 obtained when the image displayed in the picture display area 304 was captured (i.e., a control operation of the camera 103 by the camera server 101 is terminated), the indices 301b, 302b, and 303b may be erased in the display for simplified screen display.

Figure 10:
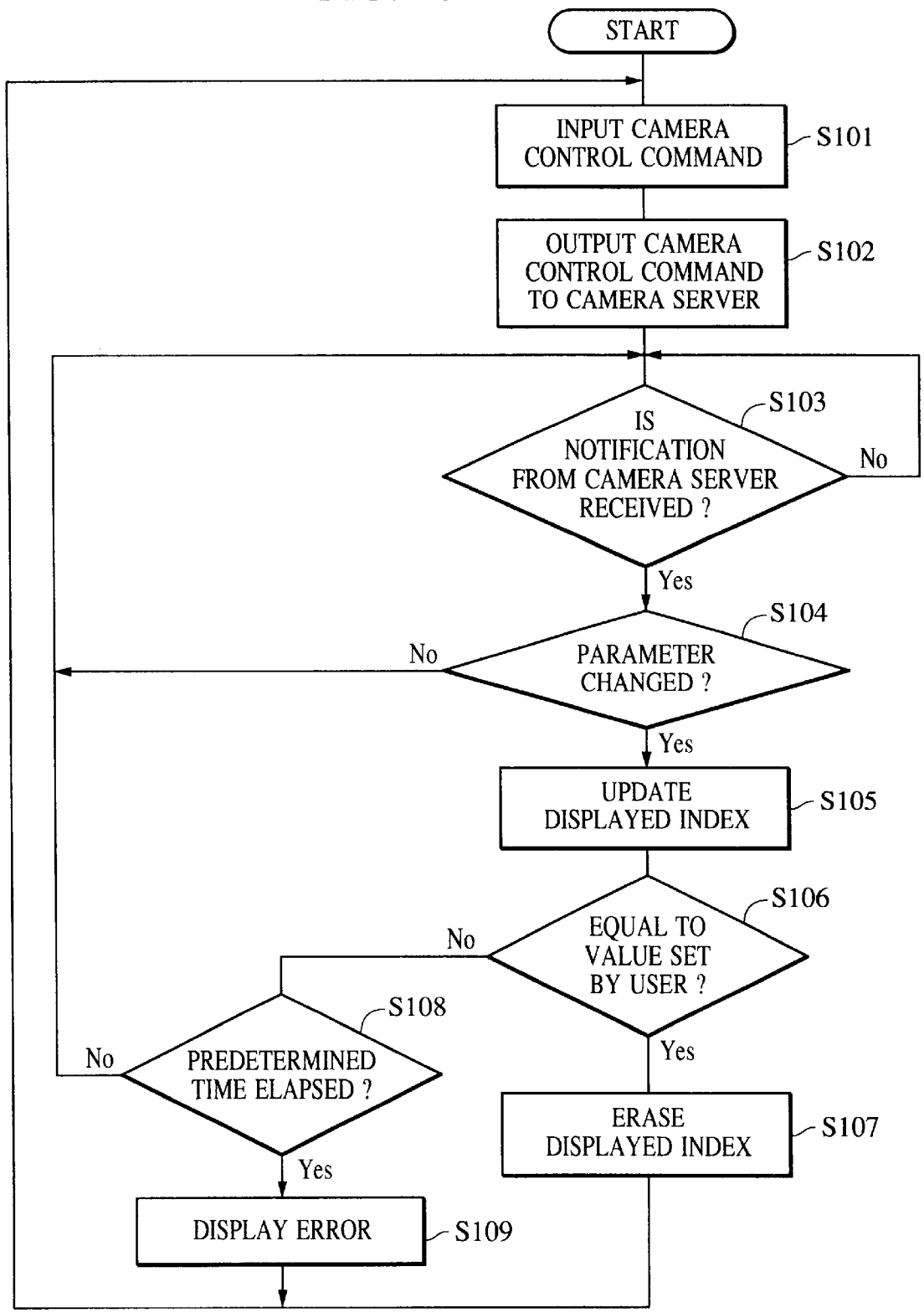
FIG. 10 is a flowchart showing another process performed by a client in a camera control system according to an embodiment of the present invention.
Figure 11:
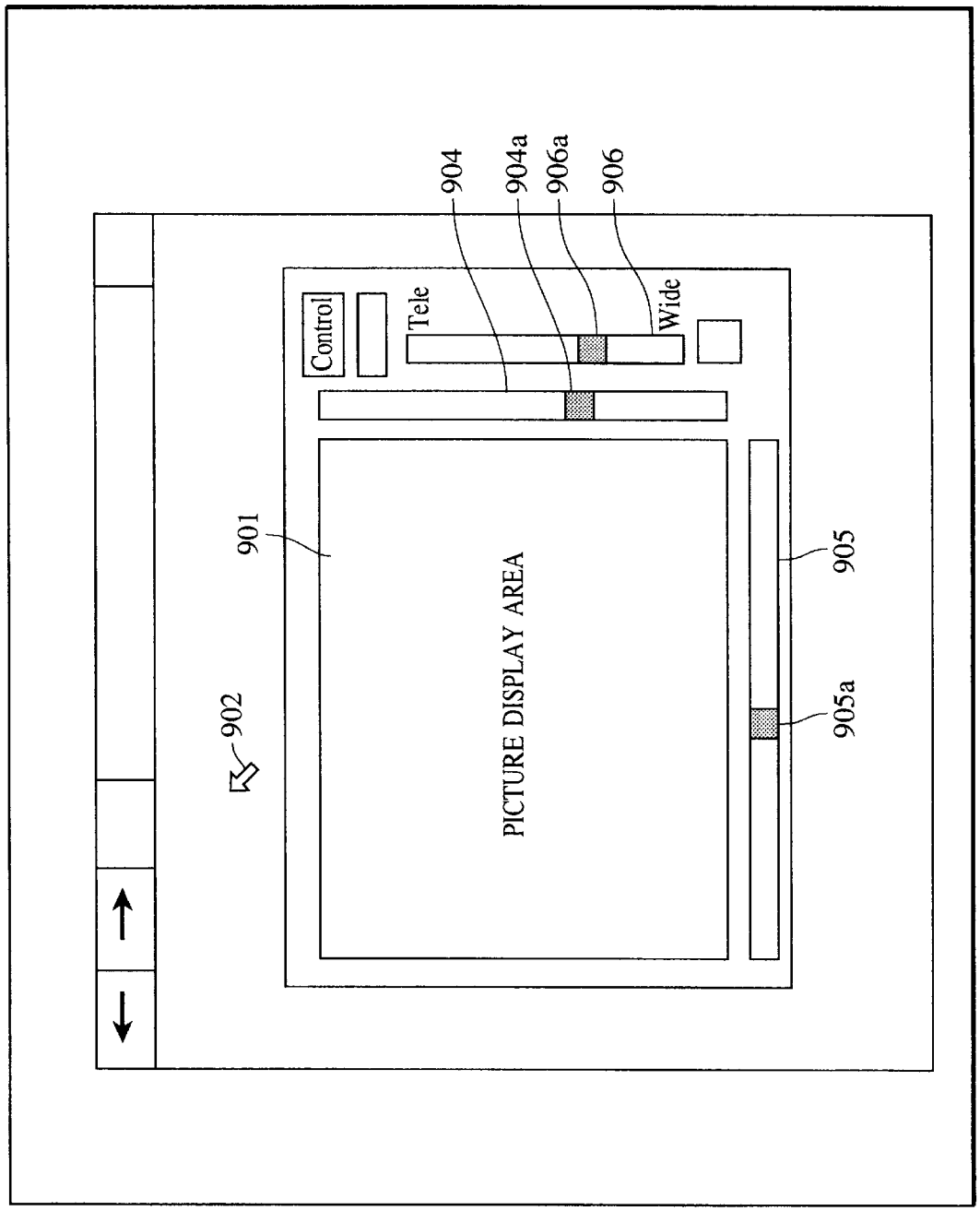
FIG. 11 is a drawing showing a conventional display screen.

FIG. 10 shows a flowchart of a process in which, when the parameters for the camera 103 set by the user are equal to the parameters for the camera 103 obtained when the image displayed in the picture display area 304 was captured, the client 102 erases the indices 301b, 302b, and 303b. Since blocks in FIG. 10 identical to those shown in FIG. 9 are denoted by the same reference numerals, a description of them is omitted.

As shown in FIG. 10, in step S106, when the parameter transmitted from the camera server 101 is equal to the parameter for the camera 103 set by the user, the process proceeds to step S107, in which, among the indices 301b, 302b, and 303b, a representation of the index equal to the transmitted parameter is erased. For example, as shown in FIG. 8B, all the parameters for the camera 103, obtained when the picture display area 304 was captured, are equal to the parameters set by the user, and the indices 301b, 302b, and 303b are not displayed.

In the above-described processing, in the case where a parameter transmitted from the camera server 101 is equal to a parameter for the camera 103 set by the user, display processing control for not displaying the index 301b, 302b, or 303b, is performed. However, display processing control for not displaying the slide key 301a, 302a, or 303a, may be executed.

In step S106, when the parameter transmitted from the camera server 101 is not equal to the parameter for the camera 103 set by the user, the process proceeds to step S108.

In step S108, if a predetermined time elapses after it is found that the two parameters are not equal, the process proceeds to step S109. In step S109, the process determines that some malfunction has occurred, and indicates an error by flashing the index 301b, 302b or 303b, or the slide key 301a, 302b or 303b. In step S108, if the predetermined time has not elapsed, the process returns to step S103.

As described above, according to the process shown in FIG. 10, when a control operation of the camera 103 is terminated, the indices 301b, 302b, and 303b are erased in the display. This makes it possible to accurately see that the image displayed on the display unit 212 is either an image obtained when operation of the camera 103 is being controlled, or an image obtained when a control operation of the camera 103 is terminated. In addition, a simplified display configuration enables the user to clearly see the screen of the display unit 212.

One embodiment of the present invention can be achieved by providing a system or apparatus with a storage medium containing a software program code for enabling the above-described functions of the foregoing embodiment, and reading and executing the program code stored in the system or apparatus.

In such a case, the program code read from the storage medium enables the above-described functions of the foregoing embodiment, and the storage medium containing the program code constitutes the present invention.

Concerning the storage medium for providing the program code, for example, a floppy disk, a hard disk, an optical disk, a magneto-optical disk, a CD-ROM, a CD-R, a magnetic tape, a non-volatile memory card, or a ROM, may be used.

The read program code is executed by a computer, whereby the above-described functions of the foregoing embodiment are realized. In addition, the present invention includes a case where the above-described functions of the foregoing embodiment are realized such that an OS or the like operating in a computer is instructed by the program code to perform all or part of actual processing.

Moreover, the program code read from the storage medium may be written in an add-in board for a computer, or a memory in an add-in unit connected to the computer, and based on instructions of the program code, the add-in board or the CPU of the add-in unit performs all or part of actual processing, whereby the above-described functions of the foregoing embodiment are realized.

In the case where the above-described embodiments are applied to a storage medium, a program code corresponding to the foregoing flowcharts must be stored in the storage medium. In other words, for a brief description, modules essential to a camera control system of the present invention are stored in the storage medium.

As described above, according to the foregoing embodiment, a parameter (for panning, tilting, or zooming state) of the camera 103 obtained when the current presently displayed image was captured, and a parameter of the camera 103 set by the user, can simultaneously be displayed and recognized. In addition, the user can see that the presently displayed image is either an image obtained when operation of the camera 103 is being controlled, or an image obtained when a control operation of the camera 103 has been terminated.

While the present invention has been described with respect to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims to be accorded the broadest interpretation so as to encompass all such modifications and equivalent structures and functions.

What is claimed is:

1. A camera control system comprising:
   an acquisition device adapted to acquire present camera parameter information from a camera, via a network; and
   a display control device adapted to simultaneously display on a display device, at a predetermined timing, camera parameter information based on a control command input by an input device and the present camera parameter information acquired by said acquisition device,
   wherein said display control device displays the camera parameter information based on the control command input by the input device and the present camera parameter information acquired by said acquisition device as relative positions, and
   wherein the position corresponding to the camera parameter information based on the control command changes in accordance with the control command.

2. A camera control system according to claim 1, further comprising a control device adapted to control the camera based on a control command input by the input device.

3. A camera control system according to claim 1, wherein when camera parameter information based on a control command input by the input device is identical to the present camera parameter information acquired by said acquisition device, said display control device displays one of the camera parameter information based on the control command input by the input device and the present camera parameter information acquired by said acquisition device.

4. A camera control system according to claim 1, wherein said display control device displays an image captured by a camera corresponding to the present camera parameter information acquired by said acquisition device, together with the camera parameter information based on the control command input by said input device, and the present camera parameter information acquired by said acquisition device.

5. A camera control system according to claim 1, wherein a control command for controlling a camera is input by moving a scroll bar by an operation of the input device, and said display control device displays the camera parameter information based on the control command input by the input device and the present camera parameter information acquired by said acquisition device as relative positions on the scroll bar.

6. A camera control system according to claim 1, wherein the camera parameter information based on the control command input by the input device is information representing at least one of pan and tilt image capture directions of a camera and a zoom magnification of the camera.

7. A camera control system according to claim 1, wherein the present camera parameter information acquired by said acquisition device is information representing at least one of pan and tilt image capture directions of the camera and a zoom magnification of the camera.

8. A control method for controlling a camera control system having a display device, comprising:
   an input step for inputting a control command for controlling the camera;
   a control step for controlling the camera based on the control command input in said input step;
   an acquisition step for acquiring present camera parameter information from the camera via a network, in accordance with control of the camera in said control step; and
   a display step for simultaneously displaying on the display device, at a predetermined timing, camera parameter information based on the control command input in said input step, and the present camera parameter information acquired in said acquisition step,
   wherein said display step displays the camera parameter information based on the control command input in said input step and the present camera parameter information acquired in said acquisition step as relative positions, and
   wherein the position corresponding to the camera parameter information based on the control command changes in accordance with the control command.

9. A control method according to claim 8, wherein when the camera parameter information based on the control command input in said input step is identical to the present camera parameter information acquired in said acquisition step, one of the camera parameter information based on the control command input in said input step and the present camera parameter information acquired in said acquisition step is displayed on the display device in said display step.

10. A control method according to claim 8, wherein in said display step an image captured by the camera, corresponding to the present camera parameter information acquired in said acquisition step, is displayed together with the camera parameter information based on the control command input in said input step and the present camera parameter information acquired in said acquisition step.

11. A control method according to claim 8, wherein in said input step control commands for controlling the camera are input by moving a scroll bar by an operation of an input device, and in said display step the camera parameter information based on the control command input in said input step, and the present camera parameter information acquired in said acquisition step, are displayed by displaying relative positions thereof on the scroll bar.

12. A control method according to claim 8, wherein each camera parameter information is information representing at least one of a pan or tilt image capture direction of the camera and a zoom magnification of the camera.

13. A control method according to claim 8, wherein in said input step a control command is input to a camera connected to a network.

14. A storage medium containing a program for executing a camera control system control process, said program comprising the steps of:
   inputting a control command for controlling a camera by an input device;

acquiring present camera parameter information from a camera via a network; and simultaneously displaying, at a predetermined timing, camera parameter information based on the control command and the acquired present camera parameter information, wherein said displaying step displays the camera parameter information based on the control command input by the input device in the inputting step and the acquired present camera parameter information acquired in the acquiring step as relative positions, and wherein the position corresponding to the camera parameter information based on the command control changes in accordance with the control command.

15. A storage medium according to claim 14, wherein when the camera parameter information based on the input control command is identical to the acquired present camera parameter information, said displaying step of the program performs display of one of the camera parameter information based on the input control command and the acquired present camera parameter information.

16. A storage medium according to claim 14, wherein said program performs display of an image captured by a camera corresponding to the acquired present camera parameter information, together with the camera parameter information based on the input control command and the acquired present camera parameter information.

17. A camera control apparatus comprising:

an acquisition device adapted to acquire present camera parameter information from a camera, via a network;

a display control device adapted to simultaneously display on a display device, at a predetermined timing, camera parameter information based on a control command input by an input device and the present camera parameter information acquired by said acquisition device, wherein said display control device displays the camera parameter information based on the control command input by the input device and the present camera parameter information acquired by said acquisition device as relative positions, and wherein the position corresponding to the camera parameter information based on the control command changes in accordance with the control command.

18. A camera control apparatus according to claim 17, wherein when camera parameter information based on a control command input by the input device is identical to the present camera parameter information acquired by said acquisition device, said display control device displays one of the camera parameter information based on the control command input by the input device and the present camera parameter information acquired by said acquisition device.

* * * * *

UNITED STATES PATENT AND TRADEMARK OFFICE
CERTIFICATE OF CORRECTION

PATENT NO. : 6,750,913 B1
DATED : June 15, 2004
INVENTOR(S) : Hideo Noro et al.

It is certified that error appears in the above-identified patent and that said Letters Patent is hereby corrected as shown below:

Column 4,
Line 1, "an" should read -- and --.
Line 50, "heigh" should read -- height --.

Column 6,
Line 15, the left margin should be closed up.

Column 8,
Line 23, "302b or 303b" should read -- 302a or 303a --.

Column 9,
Line 5, "current" should read -- currently, --.
Line 20, "to be" should read -- is to be --.

Signed and Sealed this

Twenty-eighth Day of September, 2004

JON W. DUDAS
*Director of the United States Patent and Trademark Office*